March 31, 1970 W. G. LIVEZEY 3,503,278
VEHICLE DRIVE AND STEER SYSTEM WITH POWER BOOST
Filed Aug. 21, 1968 2 Sheets-Sheet 1

INVENTOR.
William G. Livezey
BY
Charles R. White
ATTORNEY

United States Patent Office 3,503,278
Patented Mar. 31, 1970

3,503,278
VEHICLE DRIVE AND STEER SYSTEM WITH POWER BOOST
William G. Livezey, Indianapolis, Ind., assignor to General Motors Corporation, Detroit, Mich., a corporation of Delaware
Filed Aug. 21, 1968, Ser. No. 754,400
Int. Cl. F16h *37/06;* B60k *17/30*
U.S. Cl. 74—661                                10 Claims

ABSTRACT OF THE DISCLOSURE

A primary engine supplies power through a transmission providing a plurality of drive ratios which includes left and right planetary gearsets that respectively drive left and right transmission output shafts. The primary engine also drives hydrostatic steer pump and motor means having output means drivingly connected to each planetary gearset for vehicle steering purposes. There is a secondary engine which is drivingly connected to each of the output shafts by separate multi-ratio range transmission and power transmitting means so that secondary engine power can be added to that of the primary engine for power boost. The secondary engine can be utilized by itself for vehicle drive and steer and also for starting the primary engine.

---

Figure 1:
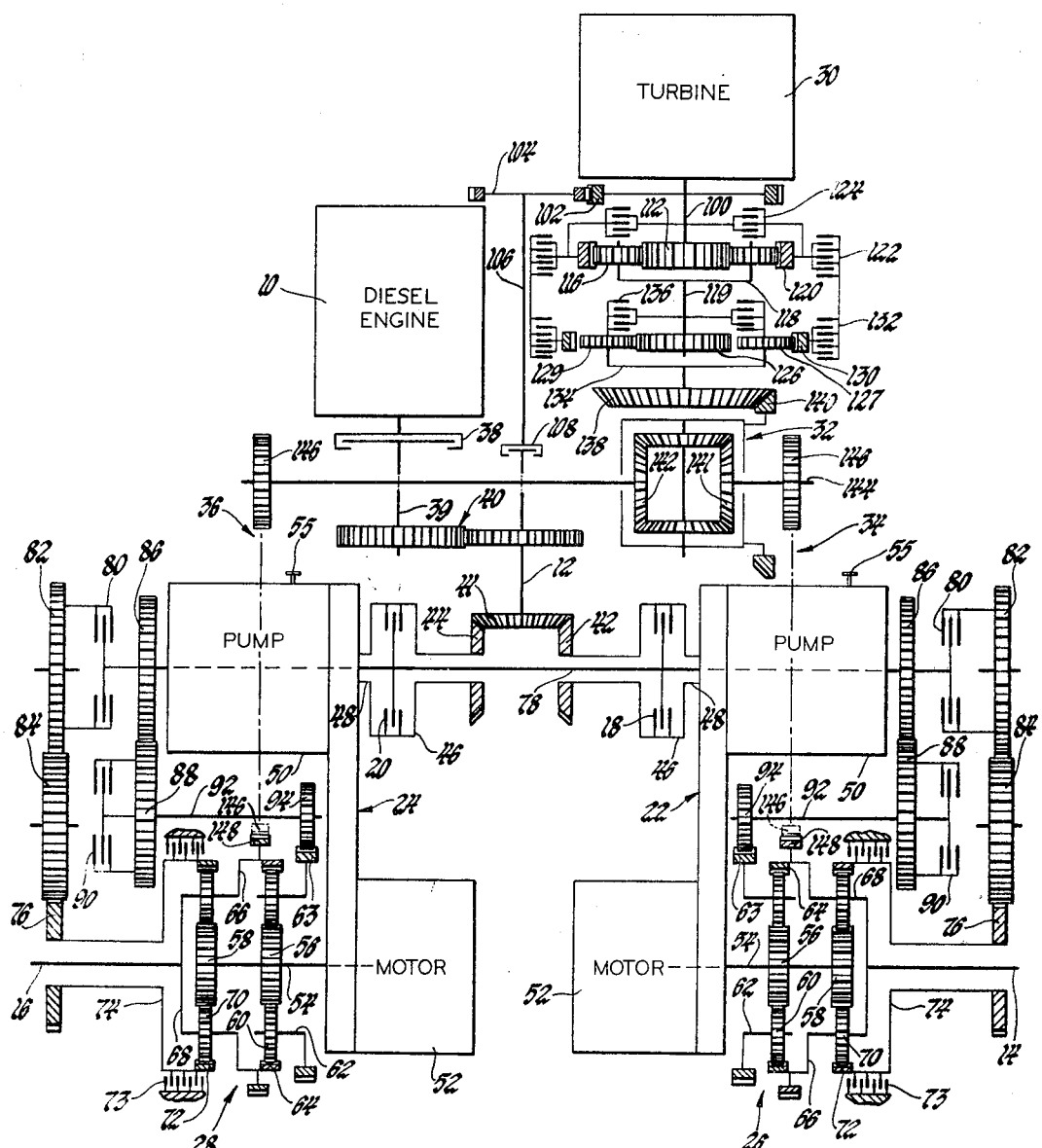

This invention relates to engine-transmission power packages for vehicles and more particularly to a power package having a primary engine powering a vehicle drive transmission and steering system and having a secondary engine and transmission for supplementing first engine drive to increase vehicle performance or for providing all power for vehicle drive and steering.

Many examples of plural engine drive exist in the prior art; and in some of these examples, there are primary and secondary engines which have their power combined to provide for power boost when vehicle performance is needed. Generally in the prior art the power is combined by a power combining gearset and the combined power is transmitted to a change ratio transmission and then to a transmission output. In other examples separate engine and power transmission packages are used to drive a single output shaft of a final drive assembly. While these prior systems have proven to be useful, they do not meet the requirement for lighter gear trains and generally do not provide for starting one engine by the other or for the drive of a steer system by a secondary power plant.

In the present invention there is a plural engine-transmission drive system which features a primary engine for driving a vehicle through gearing providing a plurality of ratios. This engine also powers a hydrostatic drive steer system. There is also provided a secondary engine which has gearing providing multi-speed drives to the transmission output which bypasses the main transmission components thereby allowing the main transmission components to be built with lighter construction. In the present invention the secondary engine can be used for driving the vehicle and the steering units when the primary engine is not operating.

The dual engine power package of this invention is particularly useful for track laying vehicle application meeting all power requirements while providing means for obtaining greater fuel economy. This is because a high percentage of the vehicle operation is at low power and idle conditions and the compression ignition engine, used as one engine in the system, furnishes sufficient power for convoy and other low power operation. A turbine engine, used as a boost engine in the system, has only limited use such as during high power and speed operations.

An object of this invention is to provide a new and improved dual engine-transmission power package in which a primary engine is operatively connected to the transmission output shafts through primary multi-speed ratio range gearing and in which a boost engine is operatively connected to the transmission output shafts by secondary multi-speed ratio range gearing which is parallel to the primary range gearing.

Another object of this invention is to provide a dual engine-transmission with hydrostatic steering; the transmission has dual outputs and includes a first engine powering a primary transmission with a hydrostatic pump and motor driven differential unit connected to right and left planetary steer units for vehicle steering drive; a secondary transmission powered by a second engine bypasses the first transmission and may be used for power boost or for the full vehicle drive with steering power being routed through the secondary transmission and the primary transmission to the hydrostatic steer pump.

Another object of this invention is to provide a dual engine drive system for vehicles incorporating a primary engine for driving a main transmission and steering system; the system further incorporating a secondary engine for driving a secondary transmission bypassing the first transmission to provide boost power when desired and for powering the vehicle and the steering system when the secondary engine is used alone.

Another object of this invention is to provide a dual engine transmission power system for vehicles with hydrostatic steer in which there is a drive connection between engine outputs for direct steer drive during operation of either engine so that a steer maneuver can be executed with power from either engine from a stationary vehicle position.

Figure 2:
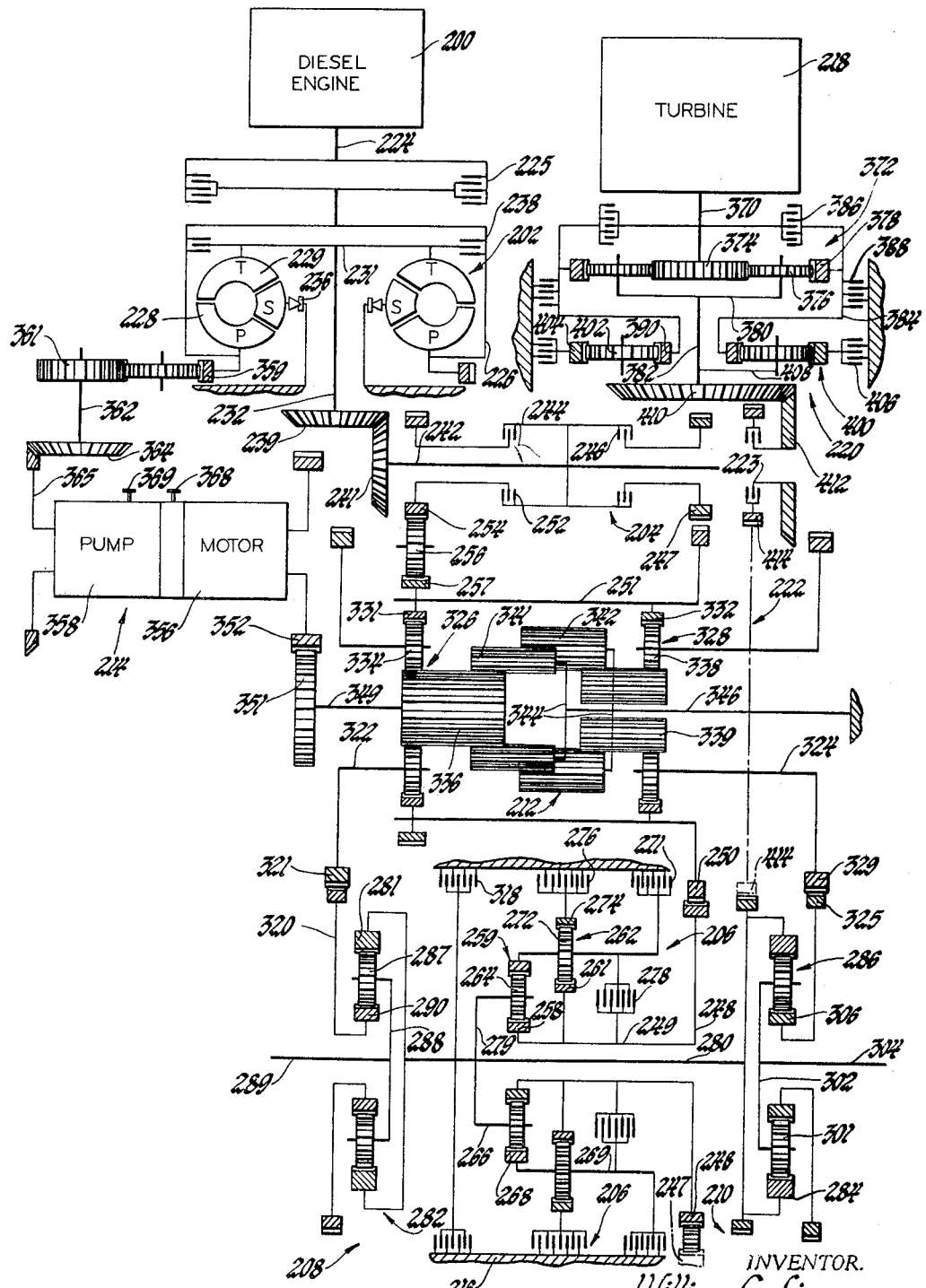

These and other objects of the invention will become more apparent from the following detailed description and drawings in which:

FIG. 1 is a diagrammatic view illustrating a first embodiment of the invention; and FIG. 2 is a diagrammatic view illustrating a second embodiment of the invention.

FIGURE 1 illustrates a dual engine and power transmission system preferably for tracked vehicles. Generally this system comprises: a primary engine 10, an engine driven shaft 12 operatively connected to right and left track-powering output shafts 14 and 16 respectively by a forward drive clutch unit 18, a reverse drive clutch unit 20, right and left hydrostatic pump and motor units 22 and 24, right and left power combining or speed differential planetary gear units 26 and 28, a secondary or power boost engine 30, and a boost engine driven differential 32 driving right and left gear trains 34 and 36 operatively connected respectively to the right and left output shafts.

The main engine 10, preferably a diesel, is operatively connected to the engine driven shaft 12 by a selectively engageable clutch 38, a drive shaft 39 and spur gearing 40. Engine driven shaft 12 drives a bevel gear 41 which meshes with and drives the side bevel gears 42 and 44 in opposite directions. The transmission components from side bevel gear 42 to the output shaft 14 are the same as the transmission components from side bevel gear 44 to the output shaft 16 so the description of the former transmission components applies to the latter components and the same retference numerals are used for the corresponding right and left transmission components hereinafter described.

Right side bevel gear 42 is drivingly connected by drum 46 to an input sleeve shaft 48 coupled to the hydrostatic pump 50 which is hydraulically connected to motor 52 on the right side. The hydrostatic pump and motor units are of conventional design with the pumps having infinitely variable displacement and the motor having fixed displacement. The speed and direction of motor output shaft 54 is controlled by a pump displacement control mechanism 55. By varying the displacement of the pump 50, the motor speed output from zero to maximum positive speed and from zero to a maximum negative speed is obtained with constant power output on controlling the displacement of the pump while pump input speed remains constant. Corresponding components which operate as described above connect the left side bevel gear 44 to the left motor output shaft 54.

Each of the power combining planetary gear units has a pair of planetary gearsets and each gearset has a sun gear 56 and 58 respectively, connected to the motor output shaft 54. The sun gear 56 of the first planetary gearset meshes with a plurality of planetary pinions 60 rotatably mounted on a carrier 62. This carrier is operatively connected to an input spur gear 63 which can be mechanically driven as will be later described. The pinions 60 mesh with a ring gear 64 that is connected by a drum 66 and the planet carrier 68 of the second planetary gearset to the associated output shaft. The sun gear 58 of the second planetary gearset meshes with pinions 70 mounted on the carrier 68. Pinions 70 mesh with a ring gear 72 which can be held for reaction upon application of low brake 73. Ring gear 72 is also operatively connected to drum 74 having a spur gear 76 which can be driven mechanically.

The mechanical drive to each power combining unit is either by the forward drive clutch unit 18 or the reverse drive clutch unit 20 and each clutch unit has a friction clutch plate assembly for connecting its clutch drum to a common power transfer shaft 78 parallel with the output shafts 14 and 16. Shaft 78 is selectively connectible by a high drive clutch 80 to a spur gear 82. Idler gear 84 meshes with spur gears 82 and 76; when clutch 80 is engaged a mechanical drive to ring gear 72 of the second planetary gearset is completed.

The power transfer shaft also drives another set of gears forming trains each of which can be drivingly connected to one of the power combining gearsets. As shown, shaft 78 drives spur gear 86 which meshes with spur gear 88. Clutch 90 when engaged connects spur gear 88 to a shaft 92 which has a spur gear 94 fixed thereto. This latter spur gear meshes with the spur gear 63 to drive the carrier 62.

Power to the transmission described is also available from a second engine, preferably gas turbine. This engine has an output shaft 100 which drives a spur gear 102. Gear 102 meshes with a drive spur gear 104 and a connected shaft 106. A clutch 108 is engageable to couple the turbine to the engine driven shaft 12 as illustrated.

To provide for power boost there is a two-speed forward and two-speed reverse drive to the output shafts 14 and 16. As shown shaft 100 also drives sun gear 112 of a two-speed planetary gearset. Sun gear 112 meshes with planets 116 mounted on carrier 118. The planets mesh with a ring gear 120 which can be held for reaction by application of low range brake 122. A high range clutch 124 is engageable to connect the sun and ring gear and thereby lock this gearset for rotation as a unit.

Carrier 118 drives shaft 119 and the sun gear 126 of a forward and reverse gearset having planet 129 meshing with this sun gear and a planet 127. Planet 127 meshes with planet 129 and with a ring gear 130. The ring gear can be held for reaction for reverse drive by application of brake 132. A dual spindle planet carrier 134 for the planets 129 and 127 may be connected with shaft 119 and sun gear 126 by application of clutch 136 to lock up this gearset.

The carrier 134 drives bevel gear 138 which meshes with and drives the bevel ring gear 140 of the drive differential 32. This differential is of conventional construction and has conventional side bevel gears 141 and 142. The right side transmission from side bevel gear 141 to the power combining gearset 26 is the same as the left side transmission from bevel gear 142 to gearset 28 so the description and reference numerals of the right side applies to the left side.

As shown bevel gear 141 drives a shaft 144 which carries a spur gear 146 fixed thereto. This spur gear forms part of the gear train 34, or 36 on the left side, which meshes with a spur gear 148 attached to the drum 66 of the power combining gearset.

In neutral, the low-drive brakes, the intermediate and high drive clutches are released. This disconnects both the hydrostatic and mechanical power paths from the output shafts. The hydrostatic pumps are driven by either one or both prime movers without transmitting power to the output shafts.

In low drive range the forward clutch unit 18 or the reverse clutch unit 20 is engaged; the intermediate drive clutches 90 as well as the high drive clutches 80 are disengaged. Both low brakes 73 are engaged to hold the ring gears 72 of the power combining gearsets for reaction. The hydrostatic units 50 and 52 are conditioned by their direction and displacement control 55 to drive the sun gears 58 forwardly for forward drive and in reverse for reverse drive. The pinions 70 walk around inside ring gears 72 causing the carriers 68 and their connected output shafts to rotate at a reduced speed in the same direction as the driving sun gears 58.

During operation in the low range each sun gear 58 is rotating at motor speed and each ring gear 64 is rotating at output speed in the same direction and these rotations combine in each power-combining planetary gearset to cause each carrier 62 to rotate in the same direction at an intermediate speed.

The ratios of the planetary gearing, the gear drive between the carrier and the intermediate clutch driven element and the geared drive between the input shaft and the intermediate clutch driving element are predetermined so that when the motors 52 reach maximum speed in the forward direction with forward drive clutch 18 engaged and in the reverse direction with reverse drive clutch unit 20 engaged, the drive and driven element of each intermediate clutch are rotating in the same direction at the same speed.

In this embodiment the shifting from low to intermediate range in either forward or reverse is accomplished when the above condition of synchronized rotation is reached by releasing low brakes 73 and engaging the intermediate clutches 90. The outer planetary gearsets of each power-combining gear unit becomes passive since they have no reaction, and the mechanical and hydrostatic drives are now combined in the inner gearsets.

In forward drive with the forward drive unit 18 engaged, the forward rotation of the motors driving the sun gears 56 subtracts from the forward rotation of the ring gears 64 and their connected output shafts. Similarly, in reverse drive with reverse drive unit 20 engaged, the reverse rotation of the motors subtracts from the reverse rotation of the output shafts. Thus in intermediate drive, ouput shaft speed is increased by reducing the motor speed through zero to maximum reverse speed in forward drive and to maximum forward speed in reverse drive.

During intermediate range operation each sun gear 58 is rotating at motor speed and each carrier 68 is rotating at output speed and in the same direction as the connected output shaft. These rotations combine in the outer planetary gear set to cause the ring gear 72 to rotate in the same direction as the driven output shaft and at an intermediate speed. The ratios of the planetary gear units 26 and 28, the geared drive between the ring gear 72 and the high clutch driven plates and the geared drive between the input shaft 12 and the high clutch driving plates are predetermined so that when the motors 52 reach their maximum speed in the reverse direction with forward drive unit 18 engaged and in the forward direction with the reverse drive unit 20 engaged, the friction elements of each high clutch 80 are rotating in the same direction at the same speed.

The shift from intermediate to high range in either forward or reverse is accomplished when the above conditions of rotational high drive clutch member speed is reached by releasing the intermediate drive clutches 90 and engaging the high drive clutches 80. In forward drive with the forward drive clutch unit 18 engaged, reverse rotation of the motors which drive sun gears 58 in reverse subtracts from the forward drive of the carriers 68 and their output shafts. Similarly, in reverse drive the reverse drive clutch unit 20 is engaged and the forward rotation of the motors subtracts from the reverse drive of the output shafts. Thus in high drive the ouput shaft speed is increased by reducing motor speed through zero to maximum forward speed in forward drive and to maximum reverse speed in reverse drive.

Steering in the drive ranges is accomplished by either independent control of each hydrostatic unit to increase or decrease output shaft speed on one side or by simultaneous control of both hydrostatic units to increase output shaft speed on one side and correspondingly decrease output shaft speed on the other side. The independent speed control and direction of each output shaft provides capabilities of turn at any speed within the vehicle's capabilites for negotiating turns and for providing true pivot steer about the vehicle's center when desired, such as that which occurs when the output shafts are driven in opposite directions at the same speed.

For power boost the turbine engine 30 is started and the power of this turbine may be applied and added directly to the diesel driven output shafts by the selective engagement of appropriate friction-drive-establishing devices in the gear train which couples the turbine engine to the output shafts. Thus, if high torque forward power boost is desired, low brake 122 and forward clutch 136 are engaged so that the carrier 134 is driven with multiplied torque and decreased speed. This drive is directed through the differential 32 and the right and left gear trains 34 and 36 to the spur gears 148 and to the output shafts. For high range forward, clutch 124 is engaged and low brake 122 disengaged and forward drive clutch 136 remains engaged. Under these conditions the planetary gearsets in the turbine power transmission are locked up, and there is direct drive to the differential 32. From the differential, the power is divided to the output shafts as in low forward. Reverse drive is the same as forward drive with the exception of the engagement of reverse brake 132 and the release of forward clutch 136. For low speed reverse, brake 122 and reverse brake 132 are engaged; for high speed reverse clutch 124 and brake 132 are engaged.

The turbine power can be used to crank the diesel engine by the engagement of clutch 108 which allows the power to flow into the diesel engine through the gears 40, shaft 39 and diesel clutch 38 when engaged.

The transmission can be operated on turbine power alone as well as diesel power. When operating on turbine alone, diesel clutch 38 is released and clutch 108 is engaged so that shaft 12 will be driven by the turbine instead of the diesel and the transmission operation is as described in connection with diesel engine operation.

The drive connection, clutch 108, between engine outputs provides for a direct steer drive during turbine drive. This makes steering independent of vehicle motion and the vehicle can be maneuvered from a stationary position during turbine drive alone as well as in diesel drive.

Referring to FIG. 2 there is another tracked-vehicle drive system with power boost having a main engine 200, preferably a diesel, a hydrodynamic torque converter 202, a forward and reverse drive clutch unit 204, a range or three-speed gear unit 206, a left steer unit 208, a right steer unit 210, a differential unit 212, and a hydrostatic pump and motor unit 214 for controlling the differential. A cylindrical housing 216 houses the range unit and the right and left steer units.

There is a boost engine 218, preferably a gas turbine, which is parallel to the diesel engine, a range transmission 220 and a drive gear train 222 which upon engagement of selectively engageable clutch 223 connects the output of the range transmission 220 to the right and left steer units.

Describing these components and their power train connection in detail, main engine 200 has an output shaft 224 connected through a selectively engageable clutch 225 and rotatable converter housing 226 to a bladed pump 228. The pump drives fluid to bladed turbine 229 which is connected by a hub 231 to converter output shaft 232. A bladed stator, grounded by one-way brake 236 disposed between the turbine and pump, directs fluid existing from the turbine back into the pump.

A converter locking clutch 238 is selectively engageable to provide a direct mechanical drive between shaft 224 and converter output shaft 232 to bypass the hydraulic path of the torque converter if desired.

The converter output shaft provides input to the three-speed gear unit 206 and also to the differential unit 212 via the forward and reverse drive clutch unit 204. As shown in FIG. 2, the range unit provides one input to each steer unit and the differential gear unit provides another input to each steer unit.

Converter output shaft 232 is connected to drive a bevel gear 239 meshing with a second bevel gear 241 that is connected to drive a shaft 242 which in turn drives clutch drum 244 of the forward and reverse drive clutch unit 204.

Drum 244 is connectible through forward and reverse drives to the three-speed gear unit 206 and to the differential unit 212. For the forward drive to these units, the clutch unit 204 has a forward drive clutch 246 which is selectively engageable to connect drum 244 to drive an annular spur gear 247. As illustrated in the lower right portion of FIG. 2, this spur gear drives an annular spur gear 248 through an idler. Spur gear 248 is connected to drive a sleeve shaft 249 which connects directly into the gear unit 206.

Gear 248 also meshes with a spur gear 250 which is connected to drive drum 251 of the differential gear unit 212. Gears 247 and 250 do not mesh. Thus in the forward drive gear train provided and with forward-drive-establishing clutch 246 engaged, shaft 242 and gear 247 drives the three-speed gear unit sleeve shaft 249 in the same direction and the differential gear input drum 251 in the opposite direction.

For reverse drive, power paths to the three-speed gear unit 206 and the differential unit 212 are completed by the engagement of a reverse drive clutch 252 in unit 204. This clutch engagement connects drum 244 to spur gear 254. Spur gear 254 meshes with idler spur gear 256. Gear 256 meshes with gear 257 which is connected by the differential drum 251 to the gear 250 meshing with the gear 248 to complete the drive to the sleeve shaft 249. In the gearing described above gear 248 rotates in the opposite direction as the driving gear 254 so that with the reverse drive clutch 252 engaged, shaft 242 drives the sleeve shaft 249 in the opposite direction and the differential gear unit input drum 251 in the same direction.

Describing the range unit components, the sleeve shaft 249 is connected to drive the sun gear 258 of a low planetary gearset 259 and also the sun gear 261 of an intermediate planetary gearset 262. The sun gear 258 meshes with pinions 264 journaled on an output planetary carrier 266. Ring gear 268 meshes with pinions 264 and is connected to an intermediate carrier 269 which may be held by a low brake 271 to provide a low ratio drive between the sleeve shaft 249 and the three-speed gear unit output carrier 266. The sun gear 261 meshes with pinions 272 journaled on the carrier 269. A ring gear 274 meshes with pinions 272 and may be held with intermediate brake 276 to provide a higher speed and intermediate ratio drive to output carrier 266.

A high clutch 278 when engaged connects sleeve shaft 249 to the intermediate carrier 269 and the low ring gear 268 to lockup the low gearset 259 to provide a direct drive between sleeve shaft 249 and the output carrier 266. The range unit output carrier 266 is connected by a hub 279 to drive the input shaft 280 of the steer units which extends freely through sleeve shaft 249. Shaft 280 is connected at its left and to the ring gear 281 of a planetary gearset 282 in the left steer unit 208 and at its right end to the ring gear 284 of a planetary gearset 286 in the right steer unit 210. Gearsets 282 and 286 have the same speed ratios and a common axis.

On the left side the steer ring gear 281 meshes with pinions 287 journaled on an output carrier 288 which carrier is connected to drive the left steer unit output shaft 289. An annular steer sun gear 290 rotatably mounted on output shaft 289 meshes with the pinions 287 and is operatively connected to the differential gear unit 212. The power train may be provided with fixed reduction ratio final speed reducers of the planetary type connected outboard of left and right steer units if desired. However, these speed reducers are not shown for purposes of simplifying the description.

On the right side the right steer ring gear 284, connected to shaft 280, meshes with the pinions 301 journaled on a carrier 302 which carrier is connected to drive the right steer unit output shaft 304. Steer sun gear 306 which is journaled on shaft 304 meshes with the pinions 301 and is connected to be driven by the differential gear unit 212 as will be described.

Describing the hydraulically controlled differential gear unit 212, the steer sun gears 290 and 306 are continuously controlled by equal speed ratio gear trains to the output carriers 322 and 324 of equal speed ratio planetary gearsets 326 and 328 which form a portion of the differential unit 212.

The left gear train comprises a spur gear 320 connected to sun gear 290 and meshing with a second spur gear 321 which latter gear is drivingly connected to the left output carrier 322. The right gear train similarly comprises a spur gear 325 connected to the sun gear 306 and meshing with a second spur gear 329 which latter gear is connected by a sleeve shaft to an output carrier 324. The ring gears 331 and 332 of gearsets 326 and 328, respectively, are connected to the interior of drum 251 driven by the forward and reverse drive clutch unit 204. Pinions 334 journaled on the left output carrier 322 mesh with the ring gear 331 and a left sun gear 336. Similarly, pinions 338 are journaled on the right output carrier 324 and mesh with the ring gear 332 and a sun gear 339. The sun gears 336 and 339 are split, as shown, to mesh with differential pinions 341 and 342, respectively. The latter pinions are rotatably supported on spindles attached to a differential carrier 344 which is grounded by a shaft 346 that extends freely through the sun gear 339 and is connected to the transmission housing.

Hydrostatic control of differential gear unit 212 is provided by the hydrostatic unit 214 operating on dual element sun gear 336. Sun gear 336 is connected by a shaft 349 to a spur gear 351. Spur gear 351 meshes with a second spur gear 352 that is operatively connected to the output of the hydrostatic motor 356 of unit 214, motor 356 being hydraulically connected to the hydrostatic pump 358. The hydrostatic pump 358 is input driven with the converter by a prime mover through a gear train which has a spur gear 359, driven by the converter housing 226, that meshes with an idler that drives a spur gear 361. Gear 361 is connected by a shaft 362 to drive a bevel gear 364 which meshes with a second bevel gear 365 to drive the input of the hydrostatic pump 358. The hydrostatic unit 214 may be of the form disclosed in Patent No. 3,273,344 to Howard W. Christenson et al. issued Sept. 20, 1966, with pump 358 having a variable displacement and motor 356 having a fixed displacement. Unit 214 has a control valve in the hydraulic circuit between the pump and motor manually operated by a handle 368 whereby the output motor shaft may be free to rotate and may be selectively driven in opposite directions at infinitely variable speeds or held. The speed and holding of the output shaft of the motor can be controlled by a pump displacement control mechanism manually operated by handle 369 while the control valve is conditioned for fluid communications between the pump and motor. It will be recognized that with the variable displacement pump 358 the output speed of the motor 356 from zero to a given speed is obtained with constant power output on increasing the displacement of the pump.

Additional power for vehicle drive is also available from the gas turbine boost engine 218 which has an output shaft 370 which drives a two-speed forward and one-speed reverse transmission that is connected to the left and right planetary steer units 208 and 210. This transmission includes a first planetary gearset 372 having a sun gear 374 driven by shaft 370, planet gears 376 which mesh with the sun gear 374 and a ring gear 378. The planet gears are mounted on carrier 380 which is connected to a drive shaft 382. A ring gear 378 is connected to a drum 384 which can be clutched to the shaft 370 by a high clutch 386 or ground to the transmission case by a low brake 388. The drum 384 is connected to drive the sun gear 390 of a secondary planetary gearset 400 which has pinions 402 which mesh with the sun gear 390 and also a ring gear 404. Pinions 402 are rotatably mounted on carrier 408. The ring gear 404 can be retarded from rotation by application of brake 406 to establish reverse drive of the carrier 408. Carrier 408 is drivingly connected to a bevel gear 410. As shown, the bevel gear 410 may also be driven by the connected shaft 382 leading from carrier 380. Bevel gear 410 meshes with bevel gear 412 at right angles thereto and the latter bevel gear drives a spur gear 414 upon the selective engagement of clutch 223. As previously pointed out, this drive from the turbine to the output is through a gear train 222 when clutch 223 is engaged.

In normal operation the power package provides four speeds in forward and reverse and hydrostatically controlled steering. For first speed (low-low forward) the forward drive clutch 246 and low-low brake 318 are engaged. The displacement control 369 of the hydrostatic unit 214 is moved to zero displacement so that these units hold the sun gear 336 stationary. The carrier 344 for differential pinions 341 and 342 is grounded to the transmission case. Under these conditions the sun gear 339 is held stationary. The ring gears 331 and 332 are driven at the same speed and in the same direction by the drive through the forward and reverse gear unit. The carriers 322 and 324 are driven in the same direction and at the same speed by the locked drive. When this happens the steer sun gears 290 and 306 are driven while the steer ring gears are held by the low-low brake. The left and right steer gearsets act as reduction ratio gearsets with the drive thus provided to drive the output shafts 289 and 304 for this high torque low speed drive.

In the differential gear unit 212, since the sun gears 336 and 339 have the same pitch diameter and the differential carrier 344 is held, positive rotation of the sun gear 336 in either direction with infinitely variable speed drive provided must result in equal and opposite rotation of sun gear 339. Thus the output carriers 322 and 324 and their gear trains connected with the steer sun gears will be driven at equal differential speeds measured from their same base speed with sun gear 336 held since the carrier speeds are determined by the combination of the dual speed ratio drive to the connected ring gears 331 and 332 and the differential drives to the sun gears 336 and 339.

Thus for steering in the low-low forward drive range, the displacement control handle 369 of the hydrostatic unit 214 is operated so that the hydrostatic motor 356 instead of continuing to hold the sun gear 336, is then caused to drive the controlled sun gear 336 in either direction depending on the direction of turn desired. Then with sun gear 336 rotating in one direction, the sun gear 339 is caused to rotate in the opposite direction at the same speed to produce the differential action in the gearsets 326 and 328. For example when the sun gear 336 is driven at the same direction as the ring gears 331 and 332, the carrier 322 speeds up by the same amount that the speed of carrier 324 is diminished. This is because the rotation of sun gear 336 will add to the contribution of the ring 331 while the opposite rotation of sun gear 339 will subtract the same amount from the ring gear 332. In this manner the steer sun gears 290 and 306 are differentially driven in the same direction or in opposite directions with locked differential drives recognizing that the left steer sun gear 290, for example, will be speeded up by the same amount that the speed of the opposite right steer sun gear 306 is diminished to thereby establish the differential steering. The steering radius is thus put under positive control and made infinitely variable by units 214 and 212 from straight ahead drive in low-low down to the minimum radius possible with the gearing provided.

Three higher forward drive ranges are obtained by driving the two connected steer ring gears 281 and 284 at forward at different speeds with the forward clutch 246 remaining engaged, holding sun gear 336 of differential unit 212 by the hydrostatic unit 214 and on selective conditioning of the range gear unit 206 to provide the low ratio drive with low brake 271 engaged, intermediate ratio drive with intermediate brake 276 engaged and high ratio with high clutch engaged in that order. In these three higher operating ranges the steer units then act as power combining and speed differential gearsets receiving power from the range unit 206 through their steer ring gears and from the differential unit 212 through their steer sun gears. Hydrostatically controlled differential steering is available in these higher ranges by control of the hydrostatic unit 214 provide locked differential drive as decribed in the low-low forward drive range, recognizing that the speed added to one of the steer sun gears will be equal to the speed subtracted from the opposite steer sun gear while the connected ring gears continue to rotate forwardly with their range unit input drive. Thus the output speed in one steer gearset is increased by the amount the output speed of the opposite steer gearset is diminished to provide the differential steering. Again the steer radius is under positive control and infinitely variable in the second, third and fourth forward drive ranges from straight ahead down to the minimum radius possible with the gearing provided.

Recognizing that the forward and reverse drive unit 204 provides the input to range unit 216 and differential gear unit 212, the same drive ranges and hydrostatically controlled differential steering provided in forward as described above are also available in reverse by simply disengaging the forward drive clutch 246, engaging a reverse drive clutch 252 and operating range unit 216 and hydrostatic unit 214 as described above.

For neutral both the forward and reverse drive clutches are disengaged, the sun gear 336 of the differential unit is held by the hydrostatic units; and there is not output drive to the transmission output shafts. Steering in neutral is provided by controlling the hydrostatic unit to drive the sun gear 336 in either direction dependent on the direction of turn desired. This causes sun gear 339 to rotate in the opposite direction, and since the drum 251 is acted upon by opposed gear forces, the connected ring gears 331 and 332, though free, provide reaction in their gearsets. Thus the output carriers 322 and 324 are caused to rotate the equal speeds and in opposite directions. Because the steer sun gears are being driven in opposite directions and at the same speed by the free differential drives provided by the differential unit 212, the connected steer ring gears, though free, provide reaction resulting in the shafts 289 and 304 being driven at equal speeds in opposite dirertions to produce pivot steering.

If the vehicle is being driven at any speed in forward and reverse by the diesel engine and power boost is desired, the turbine engine can be started and its power added to the output shafts 289 and 304 upon the selective engagement of predetermined friction-drive-establishing devices in the turbine range transmission 220.

For high-torque, low-speed boost in forward drive, brake 388 is engaged so that the planetary gearset 372 of the turbine transmission is conditioned for a speed reduction ratio drive. Carrier 380 is driven with increased torque and reduced speed. The turbine power flows from the transmission 220 through the bevel gears 410, 412, clutch 223 and through the gear train 222 to the ring gears of the steer units 208 and 210. The diesel and turbine power will be combined in these steer gear units and supplied to the output shafts for greatly increased performance. If increased speed is desired with power boost, the low brake 388 is disengaged and the high clutch 386 is engaged to lock up planetary gearset 372 in the turbine transmission. Clutch 223 remains engaged and the higher output speeds of the locked-up turbine transmission are routed to the steer gear units as previously described. The range transmission 206 can be conditioned for low, intermediate or high range operation and boost power subsequently added for performance. If boost in reverse drive is desired, only the reverse brake 406 is engaged to reverse the direction of the output of the turbine transmission; clutch 223 is engaged to complete the power path to the left and right gearsets 208 and 210. The diesel and turbine power will be combined in the steer gearsets in a manner similar to that described in connection with forward drive.

In the event that the diesel is inoperative or it is desired to use turbine power alone, the vehicle can be operated by the turbine alone upon the selective engagement of the friction-drive-establishing devices in the turbine transmission for producing either high or low forward drive, or the reverse drive. In order to obtain steer drive while operating with the turbine engine alone, the range transmission 206 must be conditioned to obtain the appropriate speed drive back through the diesel gearing to the lock-up clutch 238 and from clutch 238 to the steer pump. During this phase of operation, clutch 225 between the diesel engine and the converter is released.

Emergency cold starting of the diesel is accomplished by driving the vehicle with the gas turbine engine and engaging clutch 225. Turbine power will be routed from range transmission 206 with low brake engaged for example back to the converter or lock-up clutch through gears 247 and 248 and the forward drive clutch 246. Drive shaft 224 is then driven to start the diesel engine.

The clutch 223 and the drive train between the output of the turbine transmission and the gear train 222 leading from the turbine transmission from the steer gear units permits normal engine drive without the drive rotation of the connected turbine range components.

If desired, a gearset and clutch could be provided as an option to connect the output of the gas turbine engine directly to the converter housing to effect a drive from the turbine through the converter pump. This would provide steer power without using the diesel range gearing 206 and would permit the starting of the diesel with the gas turbine engine while the vehicle is stationary.

One important benefit of the boost systems of FIGS. 1 and 2 described above is the routing of boost power through a separate transmission to the transmission output shafts without utilizing the main transmission components. With such systems, there would be no need for strengthening main transmission components to accommodate the added power provided by the turbine engine.

I wish it to be understood that I do not desired to be limited to the exact details of construction shown and described, for obvious modifications will occur to a person skilled in the art.

I claim:

1. In a power system for vehicles comprising primary and secondary engines, first power transmission means having an input member and right and left output gear units, each of said gear units having a separate output member, said first power transmission means providing a first power path from said input member to said right gear unit and a second power path from said input member to said left gear unit, each said gear unit having a selectively engageable friction device operatively connected thereto for conditioning each respective gear unit for a predetermined speed ratio, clutch means for selectively connecting said input member to said primary engine to permit said primary engine to drive each of said output members at said predetermined speed ratio when said friction devices are engaged, second power transmission means having an input member operatively connected to said secondary engine and to each of said gear units providing separate power paths to each of said gear units for transmitting power from said secondary engine to each of said output members, and power transmitting means including selectively engageable clutch means for connecting said secondary engine to said first power transmission means.

2. In a power system for a vehicle comprising primary and secondary engines, first power transmission means having an input operatively connected to said primary engine and right and left branches each terminating in a separate transmission output, each of said branches having a planetary gear unit with an output member operatively connected to an associated transmission output, a separate selectively engageable friction-drive-establishing device for each said gear unit for conditioning each gear unit and each branch for a predetermined speed ratio, a separate hydrostatic steering unit for each branch operatively connected to an associated one of said gear units to provide steering drive thereto, each hydrostatic steering unit having a pump driven by said primary engine and a motor drivingly connected to a respective one of said gearsets, direction and displacement control means for each of said hydrostatic units for controlling the speed and output of each said motor, second power transmission means having an input operatively connected to said secondary engine and having right and left branches connected respectively to said right and left transmission outputs for transmitting boost power from said secondary engine to each of said transmission outputs, and third power transmission means for drivingly connecting said secondary engine to the input of said first power transmission and to each of said pumps to permit said secondary engine to drive said outputs through said primary transmission and to concurrently drive said pumps.

3. The power system of claim 2 wherein said second power transmission means includes a planetary gearset and operatively connected friction-drive-establishing devices selectively engageable to condition said last recited planetary gearset for predetermined forward and reverse speed ratios and wherein said third transmission includes a selectively engageable clutch for drivingly connecting said third transmission to said input of said first power transmission.

4. The power system of claim 2 and further comprising a selectively engageable clutch for connecting and disconnecting said input of said first power transmission means and said primary engine, and another selectively engageable clutch for connecting and disconnecting said third power transmission means and said input of said primary transmission means, and wherein each of said branches of said primary transmission means having meshing spur gears providing a plurality of different speed ratios for driving each respective planetary gear unit.

5. The power system of claim 2 and further comprising selectively engageable forward and reverse drive clutch units operatively connected in said first power transmission means for providing forward drive to each said gear unit when said forward drive clutch unit is engaged and reverse drive to each said gear unit when said reverse drive clutch unit is engaged.

6. In a dual engine power package for vehicles the combination comprising primary and secondary engines, right and left vehicle-driven outputs for driving a vehicle, power transmission means operatively connected to said primary engine and each of said outputs for transmitting power from said primary engine to each said output, said power transmission means including right and left power combining planetary gearsets having an output member connected respectively to said left and right outputs, hydrostatic steering means including pump means driven by said primary engine and motor means driven by said pump means and having output means operatively connected to each of said power combining gearsets, control means for controlling the speed and direction of said output means to permit said hydrostatic steering means to provide an infinitely variable steer drive to said right and left power combining planetary gearsets, power transmission means operatively connected to said secondary engine and to said gearsets for transmitting boost power from said second engine to each of said vehicle driving outputs and selectively engageable clutch means for connecting said secondary engine to said pump means to permit said secondary engine to power said hydrostatic steering means.

7. In a power package the combination comprising a primary engine, a secondary engine, a transmission having an input operatively connected to said primary engine and having a range gear unit with an output, first and second power combining planetary gearsets, each of said gearsets having a first input operatively connected to said transmission output and having a second input and an output, an infinitely variable steering unit driven by said primary engine having operatively connected hydraulic pump and motor means, a differential unit having an input driven by said motor means and having first and second outputs drivingly connected respectively to said second input of said first and second power combining planetary gearsets to provide hydrostatically controlled steer drive, a second transmission operatively connected to said secondary engine, and said second transmission having an output operatively connected to said first input of each planetary gearset for transmitting power from said secondary engine to said outputs of said power combining planetary gearsets.

8. The power package of claim 7 wherein said second transmission includes a planetary gearset and operatively connected friction-drive-establishing devices which are selectively engageable to condition said last mentioned planetary gearset for a plurality of forward and reverse drive ratios.

9. The power package of claim 7 wherein said primary transmission includes a forward and reverse drive clutch unit operatively connected between said first mentioned transmission input and said range gear unit for providing forward and reverse drive to said range gear unit.

10. The power package of claim 7 wherein said second transmission includes a multi-ratio forward and reverse range unit with an output and wherein a clutch is provided for drivingly connecting said last mentioned output to each of said first recited planetary gearsets, and wherein said secondary transmission provides a single power path from said forward and reverse range unit to said first recited gearsets.

References Cited

UNITED STATES PATENTS

| | | | |
|---|---|---|---|
| 2,268,601 | 1/1942 | Knox. | |
| 2,377,354 | 6/1945 | Merritt | 74—720.5 X |
| 2,878,691 | 3/1959 | Schjolin | 74—665 X |
| 3,194,087 | 7/1965 | Kronogard | 74—661 |
| 3,373,636 | 3/1968 | Livezey et al. | 74—720.5 |
| 3,388,684 | 6/1968 | Gros et al. | 74—661 X |

FOREIGN PATENTS

| | | |
|---|---|---|
| 742,794 | 1/1956 | Great Britain. |
| 869,470 | 5/1961 | Great Britain. |

DONLEY J. STOCKING, Primary Examiner

T. C. PERRY, Assistant Examiner

U.S. Cl. X.R.

74—675, 720.5